3,257,575
LIGHTNING ARRESTER

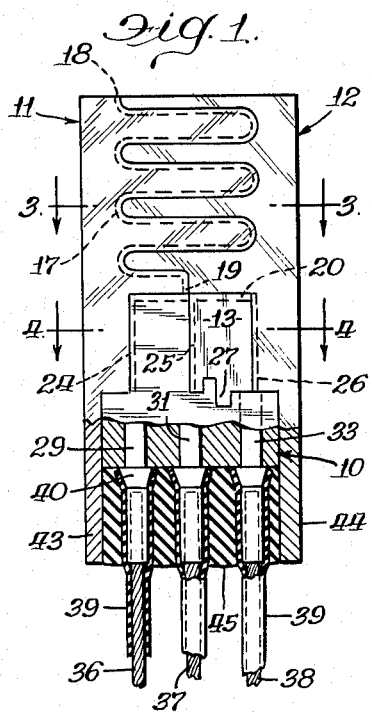

James W. Milligan, West Lafayette, Ind., assignor to Duncan Electric Company, Inc., Lafayette, Ind., a corporation of Indiana
Filed June 26, 1962, Ser. No. 205,264
13 Claims. (Cl. 313—231)

The present invention relates to a lightning arrester and is particularly adapted for use as surge relief protection for a watt-hour meter.

When lightning strikes a primary power line it will create a power surge in the secondary distribution lines connected thereto. In some instances much the same effect can be created merely by the proximity of a charged cloud to a power line even though a discharge from the cloud does not actually strike the line. Surges in the secondary line will occur even though there is a transformer between the primary and secondary lines, and despite the fact that the primary line is protected by a lightning arrester. The term "power surge" as used herein refers to the secondary line effects resulting directly from the lightning stroke on the primary line and does not refer to the flow of current from the main power source. As will hereinafter be apparent, the latter effect is designated "power follow." The power surge in the secondary lines often will be of a magnitude which will damage the watt-hour meters connected thereto. The term "lightning arrester" as employed herein is used to refer to devices for protection against lightning strokes on the protected line as well as against the power surges resulting from the lightning stroke on the primary line.

Obviously, the magnitude of the power surge in the secondary lines will vary from case to case depending upon a number of factors that are involved. A primary factor will be the magnitude of the voltage surge on the main power line. In most instances the maximum surge in the secondary line will be less than 20,000 amperes. While the period of discharge across a lightning arrester is brief, the discharge will create an electric path of ionized gas that is likely to sustain further current flow from the electric power normally present in the power lines. This factor has proven to be troublesome in devising lighting arresters or surge current protective devices for watt-hour meters. Even though the power surge resulting from the lightning stroke inherently may disappear with extreme rapidity the ionized gas across the gap of the lighting arrester will continue to carry current supplied by the normal electric power connection, an obviously undesirable situation.

The flow of current from the normal power source across the arc created by the lightning induced power surge is referred to as "power follow." Prior art devices were considered praiseworthy if they would end power follow with the occurrence of the next natural voltage zero.

As the voltage of the secondary distribution line (or on the line to be protected) is increased, the greater has been the problem in providing an apparatus for suitable protection. At 120 volts it was not too difficult to produce an arrester which would usually extinguish the arc upon the occurrence of one or two natural voltage zeroes after the termination of the power surge. Upon the occurrence of a natural voltage zero, sufficient of the ionized gas is dissipated so that with the relatively low voltage present an arc is not too often reestablished in the next half-cycle.

Substantially more difficulty was encountered in endeavoring to protect watt-hour meters connected to 240 volt lines. However, devices have been devised in which the arc usually will be extinguished at the next natural voltage zero. No lightning arresters suitable for incorporation in a watt-hour meter have been commercially available for use on 480 volt lines prior to the present invention to my knowledge. With 480 volts present in the line, sufficient ionized gas will be present following the occurrence of the next natural voltage zero to permit reestablishment of the arc in the following half cycle using prior art watt-hour meter surge protection devices.

It is desirable that the lighting arrester be incorporated in the watt-hour meter. This aids in assuring that it will be properly installed to protect the meter. Furthermore, it will prevent unauthorized tampering with the arrester in the normal course of events. However, incorporating the lightning arrester in the meter increases the problems attendant providing a suitable piece of equipment. Obviously, ionized gas is created when an arc passes between the electrodes of the arrester. If sufficient of this ionized gas becomes situated at another location in the meter at which a relatively high potential gradient is present between other parts of the meter, it can result in a second discharge erupting at that location. The likelihood of this occurring increases as the normal line voltage at the meter increases. Thus, to provide a suitable watt-hour meter surge protection device for 480 volts for example, it is necessary that the device not liberate ionized gas within the case of a meter to an extent likely to result in a secondary arc.

Conceivably, the foregoing problem might be solved by enclosing the lightning arrester in a gas-tight enclosure. Unfortunately, the problem is not that simple. If the gas-tight enclosure is relatively small, a condition suitable for installation of a device in a meter enclosure, an almost explosive force is created within the enclosure. The force is so great that often the enclosure will be ruptured. If the size of the enclosure is increased so as to reduce the forces tending to demolish it, the device becomes inherently unsuitable because of the space limitations of a meter case.

The lightning arrester of the present invention is ideally suited for use as a surge protection device for watt-hour meters and overcomes the problems previously discussed. It readily dissipates the surge occasioned by lightning striking the main power lines. Its ability to prevent power follow is nothing short of phenomenal in the light of the problem encountered with prior art devices. While power follow may occur at the time of the current surge created by the lightning, the power follow terminates almost instantaneously with the ending of the lightning-created surge. Even at 480 volts with the surge occurring at the crest of the voltage wave of the normal power source, any power follow ends long prior to the occurrence of the next natural voltage zero. It was considered to be excellent operation in prior art devices if power follow did not continue beyond the occurrence of the next natural voltage zero, even when they were connected to only 120 or 220 volt lines.

Embodiments of the present invention are very compact. There is no difficulty in incorporating an embodiment within the space limitations of the conventional watt-hour meter. Separate magnets are not required which would increase the bulk as well as the cost. Ionized gas is not liberated into the case, externally of the embodiment, at least in any quantity which begins to approach that necessary to initiate a secondary discharge in a high potential gradient area in the case.

Theoretically, a thyrite arrester might be used with a watt-hour meter but generally it has not been because of its cost (perhaps also coupled with size). In contradistinction, embodiments of this invention are relatively inexpensive to manufacture. They can be produced as an individual unit which may be readily wired into the meter by the meter manufacture. They are sturdy, and will withstand much more abuse than would ever be normally encountered.

An important feature of the invention is that embodiments thereof will withstand numerous repeated lightning-created surges without impairment of their ability to operate satisfactorily upon the occasion of the next surge. In the average location there is little likelihood of a surge occurring many times in the same meter. In a location in which the power lines are unusually subjected to lightning bolts, a number of surges may occur in a given meter over a period of years. Some surge protection devices lose all of their ability to operate satisfactorily after a few such surges have occurred. Others diminish in their ability to prevent power follow, as originally intended, after a number of surges have occurred.

The owner of the meter may not be aware of the fact that the surge protection device is potentially incapable of further satisfactory performance for the job for which it was intended. As a result, the surge protection device will not be replaced, and upon the occurrence of the next surge the meter will be damaged because of the inability of the device to fully serve its function. Since embodiments of this invention will withstand many more surges than those that are likely to occur even in areas where lightning is troublesome, the protection of the meter will be maintained.

While this invention was devised for the purpose of protecting 480 volt, 3-phase, watt-hour meters, it will be apparent to those skilled in the art that it has application in numerous other devices to be protected. Obviously, it would be suitable for 120 volt, 240 volt or 480 volt, single or multiple phase, electrical devices requiring surge protection. Because of its unusual ability to stop power follow even at peak voltages long before the occurrence of the next natural voltage zero, it could be used in the protection of devices on direct current lines in which no voltage zero would occur. Prior art devices which rely upon the occurrence of a natural voltage zero to extinguish the arc and stop power follow thereafter, obviously could not be used with direct current.

Further objects and advantages will become apparent from the following description taken in conjunction with the drawings in which:

FIGURE 1 is an elevational view, with portions broken away, of an embodiment of the invention;

FIGURE 2 is an exploded view illustrating the individual components from which the embodiment is assembled;

FIGURE 3 is a section taken at line 3—3 of FIGURE 1;

FIGURE 4 is a section taken at line 4—4 of FIGURE 1;

FIGURE 5 is a view of one of the components as seen along line 5—5 of FIGURE 2; and FIGURE 6 is a view corresponding to FIGURE 1, but in section and illustrating the functional features rather than the individual components making up the embodiment of FIGURE 1.

*Intent clause*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

In the drawings there is illustrated an embodiment of the invention for use in protecting 3-phase, 480 volt, watt-hour meters. The embodiment comprises a body which, for convenience of manufacture, is formed of four parts, a base member generally 10, two side members generally 11 and 12, and a filler member generally 13.

Side members 11 and 12 have a plurality of interdigitating fingers 14 and 15 respectively. Fingers 15 are the same thickness all the way across. However, fingers 14 have an undercut central portion which defines ridges 16 along opposite sides of each finger 14 (best seen in FIGURES 2 and 5). When members 11 and 12 are fitted together, as illustrated in FIGURE 1, the undercut central portion, between ridges 16 defines an enclosed arc chute 17. Ridges 16 on fingers 14 contact the adjacent faces of fingers 15 to provide a seal about the opposite sides of arc chute 17. Arc chute 17 is open at one end to define a vent 18 and has an inner end 19 which, within the body, is in communication with an arc chamber 20.

Arc chamber 20 is defined by a top central undercut 22 in base member 10 and a corresponding undercut 23 in filler member 13. An undercut along one side of member 10 defines an arc slot 24 communicating with arc chamber 20. A similar undercut along a side of member 13 defines an arc slot 25. Member 12 has an undercut which defines an arc slot 26. The sides of each of the members along the arc slots abut each other to provide a seal. A tongue and groove joint 27 between members 10 and 13 is provided to further ensure that there be no fluid communication between arc slots 25 and 26 (except at chamber 20).

The ends of a pair of electrodes 29 and 30 abut the adjacent end of arc slot 24. Similarly, two electrodes 31 and 32 abut arc slot 25, and two electrodes 33 and 34 abut arc slot 26. As previously mentioned, the illustrated embodiment is a 3-phase lightning arrester. Each of the pairs of electrodes, e.g. pair 29 and 30, and the associated arc slot, e.g. slot 24, function to protect one phase of the circuit. If only a single phase arrester were being constructed, four of the electrodes and the two arc slots associated therewith would not be present.

The electrodes are suitably connected to the circuit to be protected by wires secured to the various electrodes. For example, a wire 36 is inserted into a hole in the end of electrode 29 and soldered in place. Similarly wires 37 and 38 are attached to electrodes 31 and 33. An insulating sleeve 39 is slipped over the various wires. Frusto-conical insulators 40 are positioned over electrodes 29, 31 and 33. After the wires are attached, insulating sleeves 29 are fitted over the wires, electrodes and insulators 40.

Walls 42 on base member 10, wall 43 on side member 11 and wall 44 on side member 12, define a skirt about the space within which the lower ends of the electrodes are positioned. Within the space defined by this skirt an insulating material 45 is injection molded or cast. The various members 10–13 are secured together by a suitable adhesive. In some embodiments, a supplementary body (not shown) is injection molded about the completed embodiment illustrated in FIGURE 1. In so doing, however, provision is made so as not to close vent 18 of arc chute 17. The supplementary body is employed as an aid to preventing separation of the various members with a resulting fluid leak. It is important that no such fluid leak occur.

Arc slots 24, 25 and 26 are extremely thin. For example, in the illustrated embodiment the minor axis dimension, as viewed in FIGURE 4, is 0.015 inch (plus or minus 0.003 inch). The arc slots are 0.50 inch in height. The major axis dimension, as viewed in FIGURE 4, is 0.75 inch. The major axis dimension is not particularly critical and will vary depending upon the preferences of the manufacturer.

However, the minor axis dimension is extremely important. The arc slots act as an impedance to the arc as hereinafter described. This impedance is one of the factors that result in only very limited power follow, if any. The extent of the impedance provided (by the slot) will depend upon the minor axis dimension of the arc slot. Theoretically, there would be no minimum limit on the length (provided there actually is a finite length) of the minor axis dimension of the arc chute. As a practical matter, it is desirable not to make the minor axis dimension much smaller than 0.004 inch since the problems of fabrication and maintenance of the physical rigidity of the body become severe. When an arc occurs there is a substantial pressure tending to separate the various body members at the sides of the arc slot in which the arc is occurring and such disruptive forces become substantially greater with extreme narrow arc slots.

The maximum size of the minor axis dimension of the arc slot will vary depending on the line voltage, the permissible extent of power follow, the number of "shots" which the device is to withstand without appreciable change in power follow, etc. It must not be so wide that it fails to present an impedance to the arc. It must be one of the primary factors in the elongation of the arc and the displacement of the arc from the electrodes.

Outstanding performance at 480 volts is obtained with arc slots having a minor axis dimension of about 0.015 inch or smaller. There is little change in the operation of arresters with the minor axis dimension increased up to about 0.025 inch. As the minor axis of the slot is increased above about 0.035 the desirability of the arrester for general commercial use at 480 volts becomes noticeably less. There is a substantially greater erosion of the slot walls (which increases as the slot is widened). With greater erosion, the effective life of the arrester decreases. With a very substantial impedance in the line (e.g. 2 ohms, which is much greater than that *normally* present in a line), carbonization of the slot walls can occur and this then will act as a cathode spot to re-establish the arc after the occurrence of a voltage zero. With the narrower slots, any carbon that may be formed apparently is ejected by the blast of the arc, since no residual carbon is noticed. Even though they are less desirable for the foregoing reasons, I have effectively used arresters in which the minor axis is as large as 0.070 inch.

Unless otherwise apparent, the discussion herein with respect to specific details and tests pertains to 480 volt arresters since this is the principal area of need sought to be supplied by the present invention. A decrease in the normal line voltage on the circuit to be protected will permit the minor axis of the slot to be increased while still maintaining the overall effectiveness and desirability of the arrester as herein described. While at 480 volts, an arrester having a minor axis of about 0.060 inch would not be nearly as satisfactory as one having a much smaller minor axis, tests have indicated that at 240 volts an arrester having a minor axis of about 0.060 is about as satisfactory as the much smaller axis arrester operated at 480 volts. Also at 240 volts (or less) the other dimensions of the slot likewise may be reduced.

The length of discharge chamber 20, as viewed in FIGURE 6, is 0.632 inch. This dimension has no particular significance other than the fact that the discharge chamber is sufficiently long so that it communicates with each of the three arc slots 24–26. The thickness of the discharge chamber 20, as viewed in FIGURE 6, is 0.118 inch. While the discharge chamber 20 should be larger than the arc slots 24–26, the thickness is not particularly critical. The width of the discharge chamber, as measured transversely to FIGURE 6, corresponds to that dimension of the arc slots, i.e. 0.75 inch.

Arc chute 17 has a minor axis dimension (as viewed in FIGURE 3) of 0.023 inch. The major axis dimension is 0.75 inch as viewed in the same plane. The developed length of the arc chute 17 is in the range of about 3 inches. Arc chute 17 is folded for several reasons. The folded configuration provides a more compact unit. Secondly the labyrinth configuration aids in de-ionizing the gases of the arc so that ionized gases do not spew from vent 18 into the interior of the case of the watt-hour meter. The effect of the arc chute is such that an arc which otherwise would spew from one of the arc slots (in the absence of an arc chute) a distance of approximately 6 inches is completely confined within the arc chute of the disclosed embodiment.

The compactness with which a 3-phase, 480 volt lightning arrester incorporating the present invention can be made is demonstrated by the overall dimensions of the illustrated embodiment. This arrester has a height of 2.375 inches, a width (as viewed in FIGURE 1) of 0.875 inch, and a thickness of 1.0 inch.

The material from which the body of the lightning arrester is made should of course be an insulator. It should maintain the structural rigidity of the unit. In addition, it should be a material which, in the presence of the arc, will produce a gas which will dilute the arc and produce a fluid blast acting to assist in moving the arc away from the electrodes. The material preferably employed is a polymerized acetaldehyde resin, such as that sold under the name Delrin. The vulcanized fiber sold as Horn Fiber is suitable. However, Horn Fiber does have the disadvantage that it is adversely affected by high humidity. In many installations this will prove to be no problem. An alumina ($Al_2O_3$) hydrate filled polyester resin has been employed. While a suitable arrester can be produced from this material it does not have as long a service life as might be preferred. The arc slots tend to erode too rapidly, and thus the number of surges that the unit satisfactorily will handle are diminished.

While the reason is not fully understood, it has been found that the best operation is obtained when the electrodes are not centered with respect to the arc slots with which they communicate. The offset of the electrodes, wtih respect to the arc slots, is illustrated in FIGURES 1, 4 and 6. An offset of the center of the electrode to the center of the slot of about 25% of the thickness of the electrodes has been found to be eminently satisfactory. In the illustrated embodiment, the diameter of the electrodes is 0.125 inch. Their axes are offset with respect to the center of the respective arc slot, a distance of 0.030 inch. The axes of each pair of electrodes, e.g. electrodes 29 and 30, are 0.205 inch apart. The electrodes are approximately parallel to each other to obtain magnetic blowout as hereinafter described.

Numerous conductive materials could be employed for the electrodes. The harder metals, e.g. hard copper and hard brass, are substantially superior to the soft materials, e.g. soft copper and soft brass. A brass, nominally 70 percent copper and 30 percent zinc, cold drawn, 6 B&S gauge number hard, is very satisfactory.

When a surge in the secondary line occurs as a result of a lightning stroke some place on the main power line, the surge will spark over between one pair of electrodes. For example, assume that electrode 30 is grounded and the surge occurred on the wire to which electrode 29 is connected, an arc then will occur at the base of arc slot 24 between the ends of electrodes 29 and 30. Three magnetic fields will be set up by, respectively, the current flow through electrode 29, the current flow in the arc between the ends of the two electrodes and the current flow in electrode 30. These magnetic fields will interact in motor action, to urge the central portion of the arc to billow away from the two electrodes.

At the same time the arc will be physically pinched because of the narrowness of the arc slot. This constriction of the arc in the area of the electrodes further serves to project the arc out away from the ends of the electrodes in substantially a planar sheet. The arc is forced into intimate contact with the walls of the slot. A cooling of the arc results from the increased exposed surface area of the arc in relation to its cross-sectional area of the arc.

Thirdly, gas is evolved from the body of the arrester as a result of the contact of the arc thereon. The gas movement out of the arc slot adds a further pressure on the arc acting to drive the arc away from the ends of the electrodes. This gas, which does not ionize, dilutes the arc. The greater the current flow in the arc, the larger will be the amount of gas evolved.

All of these three factors serve to increase the arc impedance. The substantial increase in arc impedance achieved by my invention serves to minimize, if not eliminate, power follow across the arc. I believe that there is a synergistic effect between the three factors. Certainly the pinching of the arc enhances the effect on the arc of a given quantity of gas evolved from the walls. It appears that these two alone are insufficient, but that magnetic blowout is required in addition. Also, magnetic blowout in a single gap (as in the present invention) is inadequate alone to achieve the result.

In the absence of an arc chamber or chute, an arc will be created which would extend from the end of the arc slot as much as 6 inches or more. In the illustrated embodiment, the arc projecting from the arc slot is trapped, cooled and deionized within arc chamber 20 and arc chute 17. The arc will not extend beyond the vent 18 at the end of the arc chute. Because of the thinness of the other arc slots, e.g. 25 and 26, and the fact that the arc chute 17 is vented, insufficient ionized gas enters the remaining arc slots, e.g. 25 and 26, to occasion a discharge between the electrodes therein. Other than its extension into the arc chamber and chute, the arc remains confined to the arc slot in which the discharge originated. In addition to confining the arc the chute performs substantially the same functions (discussed elsewhere herein) as the arc slot, albeit to a somewhat lesser extent.

It is important that the body structure be sufficiently strong to withstand the mechanical pressure occurring as a result of the arc discharge. No ionized gas should be permitted to leak through any of the joints from the arc slot in which the arc originates, either to a point externally of the body, or into another of the arc slots.

It is important that the space into which the slot discharges be vented. Of course if that space were extremely large, e.g. several cubic feet or more, it is unlikely that sufficient pressure would occur to cause difficulties. However, a space of that volume is not practical—particularly when it is desired to put the apparatus in the case of watt-hour meter, which case itself is smaller.

A lightning induced surge, as discussed herein, will last for only a few microseconds. Of course, this is more than sufficient to initiate a discharge between a pair of electrodes. During the period of time that the surge occurs and an arc is present, there would seem to be no reason (under conventional concepts) why current from the normal power supply cannot flow across the arc. With conventional equipment, such a current will continue to flow after the initial surge is terminated and at least up to the next natural voltage zero. In embodiments of this invention, power follow, if it occurs, will terminate long prior to the next natural voltage zero, even through the lightning induced impulse is timed to occur approximately coincident with the crest of the voltage sine wave.

Surprising enough, tests have indicated that in some arresters embodying my invention having a relatively narrow arc slot, there is no apparent power follow even at the time that a surge (corresponding to a lightning induced surge) occurs. This occurs most frequently with large surge currents. With lower surge currents some power follow will appear at the time of the surge, but will be promptly extinguished as hereinbefore explained. Power follow becomes increasingly apparent as the minor axis dimension of the arc slot is increased. With the relatively larger slots, i.e. from about 0.035 inch to about 0.070 inch, power follow generally will be apparent at the time of the surge even with relatively large surge currents.

Using an 80 kva. transformer bank as a normal power supply, with a very low secondary impedance, there could be a short circuit current of upwards of 3000 amperes R.M.S. However, upon the occurrence of an impulse discharge corresponding to that resulting from a lightning stroke, the power follow in embodiments of the invention is observed to be in the range of about 300 amperes crest. A power follow of such a minor amount under these circumstances, is insignificant in comparison to the operation of prior art devices. Protective devices of the type devised have been tested by as many as 300 shots (impulse induced discharges) with only 4 of the shots resulting in a power follow of as much as 500 amperes crest. Those skilled in the art will appreciate that such a service life is more than adequate to provide the required protection. It is believed that arresters can be constructed, in accordance with this invention, which are good for many more shots than this.

I claim:

1. A surge current protective device for an electrical apparatus such as for example a watt-hour meter, said device including: a pair of rod shaped electrodes having terminal ends and means to connect the electrodes to said apparatus whereby an arc is formed between the terminal ends of the electrodes upon the occurrence of a surge; means positioning said electrodes side by side, approximately parallel to each other and with said ends oriented in a given direction, said means insulating and confining said electrodes except for the terminal ends so that an arc can extend only from said terminal ends and the current of the surge creates a magnetic motor action to drive the intermediate portion of the arc away from the ends; and means defining a vented enclosed space about said ends, said space having a lateral dimension less than the maximum dimension, in the same direction, of the electrode.

2. A surge current protective device including: a body of insulating material having walls defining a slot with an open side, said slot having a narrow width as measured between two opposite walls; a pair of rod shaped electrodes embedded in said body and having at least partially exposed terminal ends in said slot opposite said open side, said exposed ends having a width at least as great as said width of the slot, the portions of the electrodes adjacent said ends being embedded side by side and approximately parallel to each other and to said slot; and a vented envelope enclosing the open side of the slot.

3. A device as set forth in claim 2, wherein the envelope defines a chute having one end in communication with the slot and the opposite end forming a vent, said chute having a thickness greater than that of the slot and yet relatively narrow.

4. A device as set forth in claim 3 wherein, said chute is folded.

5. A surge current protective device including: a pair of rod shaped electrodes positioned side by side, each electrode having an end commonly oriented with respect to the corresponding end of the other electrode, said electrodes having approximately co-planar axial portions contiguous to said ends; insulating means between said electrodes to prevent an arc from occurring therebetween except at said ends, means extending from said ends of the electrodes to pinch an arc formed between the electrodes, said means comprising an arc slot intersecting said ends and disposed approximately in the common plane of said portions, said slot having a length measured in a direction away from the two ends, a width as measured parallel to said plane and a thickness as measured normal to said plane, said width being at least as great as the spacing between said ends, said thickness being no greater than the thickness of the electrodes as measured in a corresponding direction.

6. A surge current protective device including: a body having walls defining a slot with an open side, said slot having a narrow width as measured between two opposite walls; a pair of rod shaped electrodes embedded in said body and having at least partially exposed terminal ends in said slot opposite said open side, said electrodes having a width, as measured parallel to said width of said slot, that is at least as great as said width of said slot, said electrodes having portions adjacent said ends, each with a longitudinal axis approximately parallel to the axis of the other, said portions being side by side with said axes approximately parallel to the slot and offset to one side of a plane midway between said two walls.

7. A device as set forth in claim 6 wherein, said slot has a width of between approximately 0.004 inch and approximately 0.070 inch and said offset is approximately 25% of the thickness of the electrodes.

8. A device as set forth in claim 7 wherein, said walls are formed of a material which emits an arc-quenching gas in the presence of an arc.

9. A multi-phase surge current protective device including: a body of insulating material having walls defining a slot for each phase, each slot having an open side and a relatively narrow width as measured between two opposite walls thereof; two rod shaped electrodes for each slot, the electrodes being embedded in the body and having at least partially exposed terminal ends at the side of the respective slot opposite the open side, said electrodes having a width, as measured parallel to said width of said slot, that is at least as great as said width of said slot, the portion of each of the two electrodes adjacent said ends being side by side and approximately parallel to the other of the electrodes of the respective slot; said body defining a vented envelope about all of said open sides.

10. A three phase surge current protective device for an electrical apparatus such as for example a watt-hour meter, said device including: three pair of rod shaped electrodes having terminal ends and means to connect the electrodes to said apparatus whereby an arc is formed between one pair of electrodes upon the occurrence of a lightning surge; means positioning each electrode of a pair side by side with the other of the pair, approximately parallel to the other of the pair and with said end thereof oriented in the same direction as the end of the other of the pair, said means insulating and confining said electrodes except for the terminal ends so that an arc can extend only from said terminal ends and the current of the surge creates a magnetic motor action to drive the arc in a loop away from the ends; and means separately encompassing the space about said ends of each pair of electrodes, said space having a lateral dimension less than the maximum dimension, in the same direction, of the electrodes to pinch the arc occurring between a pair of electrodes and force the arc to be further extended, the last means also acting to prevent the ionized gases from the arc from reaching the other two pair of electrodes in a quantity sufficient to initiate a discharge therebetween.

11. A three phase surge current protective device including: a body of insulating material having walls defining three slots, each slot being closed on all but one side and having a narrow width as measured between two opposite walls intersecting said one side, said body defining a vented arc chute communicating with each slot; and a pair of rod shaped electrodes for each slot, embedded in said body, positioned side by side approximately parallel to each other and to the slot and having at least partially exposed terminal ends in the slot, said terminal ends having a width, as measured parallel to said width of said slot, that is at least as great as said width of said slot.

12. A device as set forth in claim 11, wherein said walls are formed of a material which emits an arc-quenching gas in the presence of an arc.

13. A device as set forth in claim 12, wherein said material is polymerized acetaldehyde resin.

References Cited by the Examiner

UNITED STATES PATENTS

| 1,714,522 | 5/1929 | Everett | 313—325 |
| 1,923,748 | 8/1933 | Roman | 313—231.1 |
| 2,334,218 | 11/1943 | Raloson | 313.231.1 |
| 2,917,662 | 12/1959 | Cunningham | 315—36 |

FOREIGN PATENTS

| 986,916 | 8/1951 | France. |
| 687,886 | 2/1953 | Great Britain. |
| 379,301 | 3/1940 | Italy. |

GEORGE N. WESTBY, *Primary Examiner.*

J. D. KALLAM, *Examiner.*